Sept. 17, 1963
J. D. POST
3,104,073
MULTI-LAYER LAMINATING MACHINE
Filed Dec. 22, 1960
3 Sheets-Sheet 1
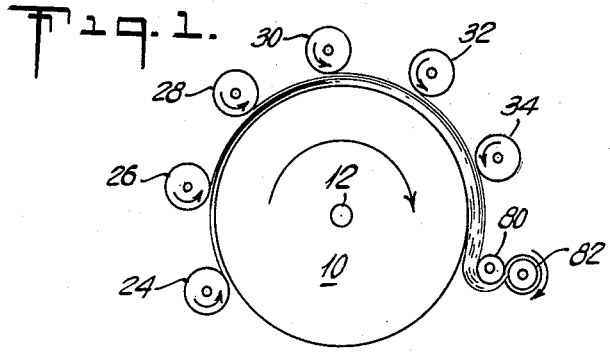
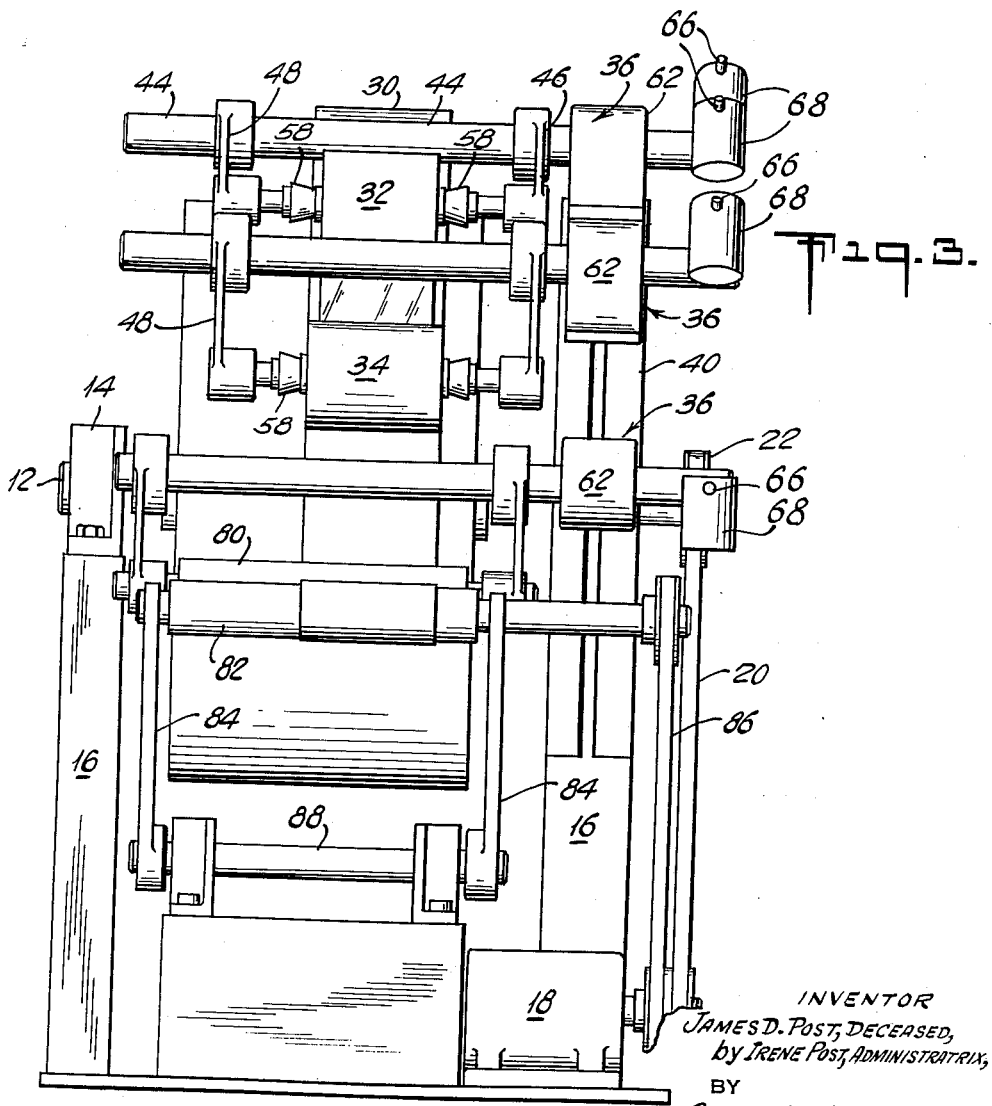
INVENTOR
JAMES D. POST, DECEASED,
by IRENE POST, ADMINISTRATRIX,
BY
Moses, Nolte & Nolte
ATTORNEYS

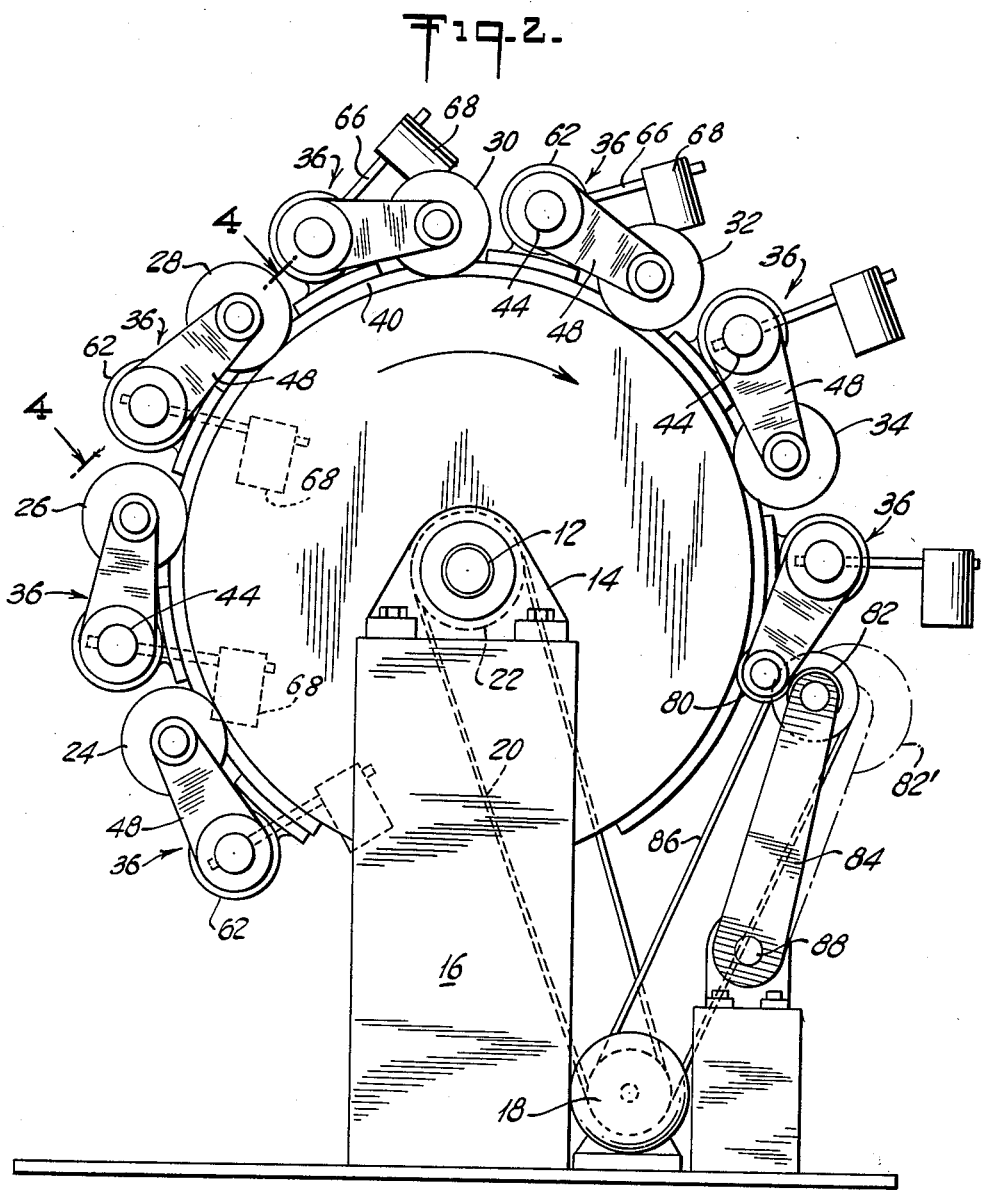

Sept. 17, 1963 J. D. POST 3,104,073
MULTI-LAYER LAMINATING MACHINE
Filed Dec. 22, 1960 3 Sheets-Sheet 3

INVENTOR
JAMES D. POST, DECEASED,
by IRENE POST, ADMINISTRATRIX,
BY
Moses, Nolte & Nolte
ATTORNEYS

United States Patent Office 3,104,073
Patented Sept. 17, 1963

3,104,073
MULTI-LAYER LAMINATING MACHINE
James D. Post, deceased, late of Danbury, Conn., by Irene Post, administratrix, Danbury, Conn., assignor to Republic Foil, Inc., Danbury, Conn., a corporation of Delaware
Filed Dec. 22, 1960, Ser. No. 77,761
3 Claims. (Cl. 242—67.2)

This invention relates in general to sheet laminating machines and in particular to improvements in machines for laminating metallic foil and insulating paper as commonly employed in the manufacturing of electrical condensers.

This application is a continuation-in-part of applicant's prior co-pending application, Serial No. 4,037, filed January 22, 1960, now abandoned.

The invention employs sheet supply rolls arranged in spaced relation about a central drive cylinder. The material supply rolls each have an axis of rotation substantially parallel to the main drive cylinder axis of rotation and are held in peripheral contact with the drive cylinder. Each of the supply rolls is provided with an individual adjustable support mechanism which allows any desired peripheral positioning of each supply roll. Additionally, the support mechanism is adapted to be readily adjustable to various width supply rolls. With this flexible arrangement the supply rolls may be advantageously spaced about the drive cylinder in an alternating fashion of paper and metallic foil or in any other desired sequence of lamina. In operation, the central drive cylinder is rotated, whereupon the supply rollers are surface driven due to their contacting relation with the cylinder and unroll and deposit their respective material upon the outer periphery of the drive cylinder. As the drive cylinder rotates, successive layers are deposited thereon in overlapping relation, and are carried by the cylinder to a takeoff position where the multi-layer lamination is separated from the drive cylinder and spooled onto a takeup roll or alternatively directed to an adjacent processing mechanism (not shown).

With this arrangement, wherein all the supply rollers are directly driven from the main drive cylinder, a uniform linear deposit speed is insured for all the individual laminations. As the supply rolls decrease in outside diameter they are continually urged in a radial direction toward the drive cylinder axes of rotation by gravity, counterweights or springs so that peripheral contact is maintained. By thereby providing this positive driving relationship between the drive cylinder and its respective supply rolls, improved condenser laminating is accomplished because substantially uniform and low tension is maintained in all layers. Foil breakage is also reduced. As the main drive cylinder is stopped, a direct corresponding slowing down of all the supply rollers occurs in view of their direct contact with the drive cylinder thereby preventing any overrunning of the supply rollers.

Another feature of the present invention is that it is readily adaptable to laminating successive layers having different widths. Each supply roll support mechanism is readily adjustable to any desired supply spool width by the mere readjustment of the end support brackets. Furthermore the flexibility of supply spool support arrangement allows transverse staggering of various width sheet material to accomplish any desired amount of overlapping.

A further feature of the invention is that cutting rollers may readily be adapted between the supply roll and the drive cylinder.

An object of the invention, therefore, is to provide an improved sheet laminating machine.

Another object is to provide a sheet laminating machine wherein the supply rolls are maintained in peripheral contact with a central drive cylinder.

Still another object of the invention is the provision of a laminating machine wherein all of the supply rolls are driven at a uniform linear speed from the same central drive cylinder.

A still further object is to provide a laminating machine of the character described wherein improved, extremely flexible supply roll support means are adjustably positionable about the periphery of the drive cylinder.

Yet another object of the invention is to provide a laminating machine wherein cutting may be performed upon one or more laminations during the laminating process.

Other objects and advantages of the invention will become apparent and the invention will be fully understood from the following description and drawings in which:

FIG. 1 is a diagrammatic view of the invention as embodied in FIGS. 2 and 3;

FIG. 2 is a front elevational view of one form of the invention;

FIG. 3 is a side elevational view of the embodiment shown in FIG. 2;

Figure 4:
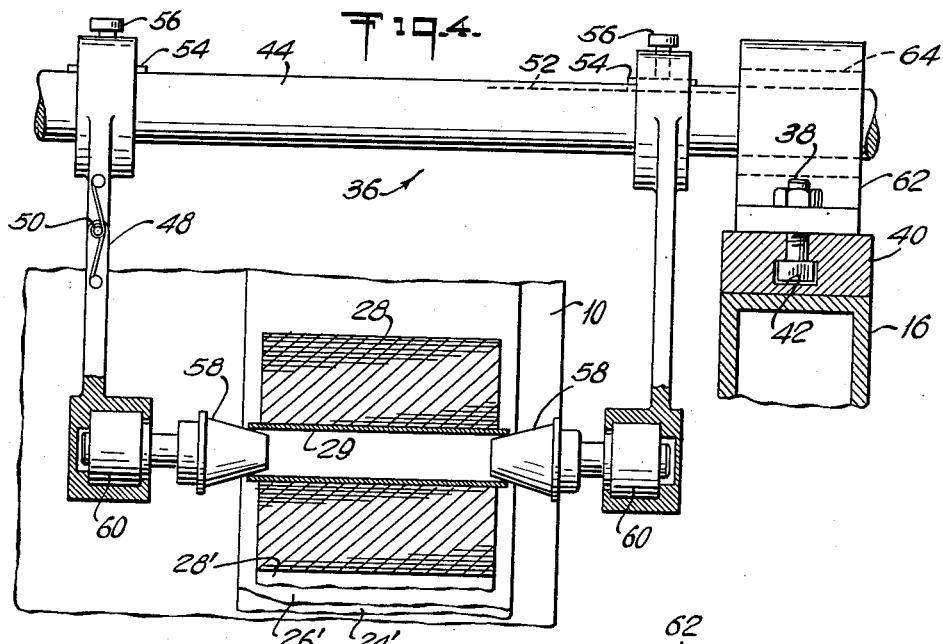
FIG. 4 is an enlarged partial cross-sectional view taken along line 4—4 of FIG. 2 showing an adjustable supply roll support bracket.

Referring to the drawings in particular, the invention as embodied includes a central drive cylinder 10 rotationally supported by a shaft 12 and a pair of spaced journal bearings 14 mounted upon upstanding support 16. A drive motor 18 is connected through a belt 20 to a pulley 22 affixed to the cylinder shaft 12. Arranged in spaced relation about the drive cylinder 10 are a plurality of paper feed or supply rolls 24, 26, 30 and 34 having their outer peripheries in contact with the outer periphery of the drive cylinder 10. The supply rolls have axes of rotation lying substantially parallel to the drive cylinder axis 12 and are pivotally supported by an adjustable support bracket assembly 36 (see FIG. 4). Also spaced about the periphery of the drum are similarly supported first and second foil supply rolls, respectively 28 and 32. All of the supply rolls are supported in their respective mounting assemblies 36 which are secured by bolts 38 to a curved channel 40 adjacent one end of the drive cylinder and having an outer periphery concentric with the drive cylinder periphery. The channel 40 contains an inverted T shaped slotted portion 42 which engages the head of the bolts 38. Each bracket assembly 36 includes an overhanging shaft 44 pivotally mounted in a bearing 64 in a support member 62. Affixed to an overhanging end of each shaft 44 is an arm 66 carrying a counterweight 68 which operates to continually bias the respective supply rolls against the drive cylinder 10. However it should be understood that any alternate rotational bias means could be employed for this purpose. A pair of supply roll end brackets 46 and 48 are slidably mounted upon the shaft 44 through a keyway 52, key 54 and locknut 56 arrangement. The bracket 48 is provided with a central hinged portion 50 which is spring biased in a direction toward the opposite bracket portion 46. At the free ends of the end brackets 46 and 48 are located a pair of spindles 58, 58 rotationally mounted in bearings 60. The spindles 58 have conical portions which engage the end of the hollow core 29 of a typical supply roll 28. The arrangement of adjustable supply roll support described should be understood as being typical of all those spaced about the periphery of the drum 10 shown in FIG. 2 and the mounting of the specific supply roll 28 is shown merely for illustrative purposes. As shown in cross-section in FIG. 4 the foil layer 28' from roll 28 is being deposited upon the respective layers 26' and 24' previously deposited upon the cylinder 10.

Also driven by the motor 18 through a slip belt arrangement 86 is a takeup roll 82 in peripheral contact with a takeoff roller 80 adjacent the drum 10. In operation, as the drum 10 rotates in a clockwise direction, successive layers of insulating paper are deposited on cylinder 10 by rolls 24 and 26, then a layer of foil from roll 28, another layer of paper from roll 30, a second layer of foil from roll 32 and a final layer of paper from roll 34. Thereafter the entire lamination continues for a short distance about the periphery of the drum 10 and around the roller 80 to the supply roller 82 also rotating in a clockwise direction. Under continued rotation of the drum 10, as the diameter of roll 82 increases to the dotted diameter 82' it is necessary that a uniform winding rate occurs upon the takeup spool 82. The invention accomplishes this by providing an excessive driving speed to the belt 86 for all possible diameters of the spool 82 so that the belt 86 will slip and effect uniform tensioning of the lamination upon the takeup spool 82. As takeup spool 82 increases in diameter, the supporting arms 84 pivot about the shaft 88 to maintain it in peripheral contact with the idler 80.

Figure 5:
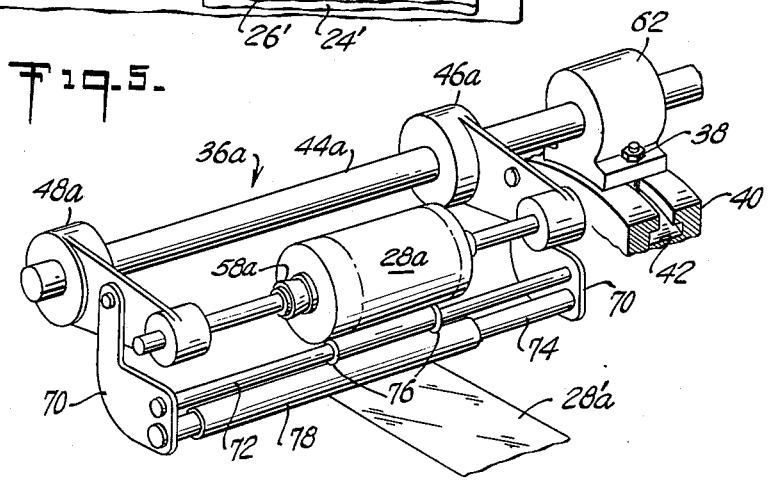
FIG. 5 is a perspective view showing another form of support bracket assembly.

Referring to FIG. 5 another embodiment of supply roll support bracket assembly 36a is shown which incorporates a longitudinal cutter mechanism mounted upon auxiliary idler shafts. This embodiment includes similar brackets 46a and 48a slidably mounted upon a support shaft 44a. Depending from each of the brackets 46a and 48a are a pair of auxiliary brackets 70 which support shafts 72 and 74 therebetween. Shaft 72 carries a pair of rotary cutter wheels 76 in contact with the supply roll and also in contact with a pressure roller 78 upon the shaft 74. The roller 78 is in peripheral contact with the surface of the cylinder 10 (not shown) and is driven thereby in the previously described manner. This embodiment allows the accurate cutting to any desired width of the sheet stock as it is deposited upon the main drum 10.

Figure 6:
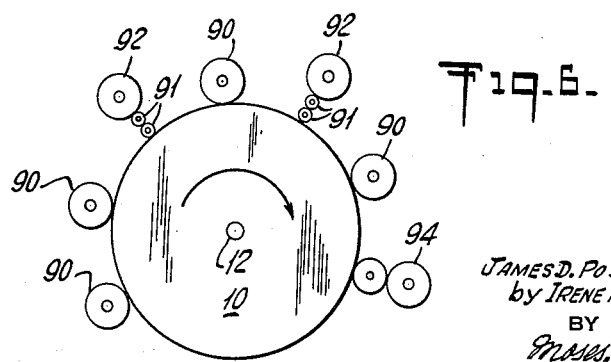
FIG. 6 is a diagrammatic view similar to FIG. 1 showing schematically an alternate form of the invention.

In FIG. 6 still another embodiment of the invention is diagrammatically shown wherein a drive cylinder 10 includes a plurality of paper supply rollers 90 spaced thereabout, and a pair of foil supply rollers 92 at various locations therebetween. The foil rollers are shown as being driven through intermediate idler rollers 91 which may contain any pattern of embossing or other design. As in the previous embodiments, this form of the invention also obtains all unwinding momentum from the central drive cylinder which is driven by motor means (not shown).

Thus it can be seen how the invention has provided a laminating machine which is extremely flexible and adaptable to various numbers of layers of varying widths and degrees of overlapping relation. The invention has provided a machine which is capable of higher speed operation than the prior art that is not subject to frequent sheet breakage or large overruns of sheet material during changes in the rotational speed of the main cylinder 10 due to the fact that the cylinder also acts as a brake as well as a drive mechanism.

The particular embodiment described has been found to be applicable to the preparation of stock material for electrical condensers wherein positive and negative foil plates are electrically isolated from one another, but while a specific embodiment of the invention has been shown and described in detail to illustrate the application in the invention principles, it will be understood that the invention may be embodied otherwise without departing from such principles. For instance, the invention is equally applicable to materials other than insulating paper and metallic foil used in making condensers. Likewise, more or fewer supply rolls could be arranged in peripheral contact about the central drive cylinder without departing from the scope of the invention. Any arrangement of rotary cutters can also be employed to provide both transverse and longitudinal cuts in any of the supply feeds in well known fashion without departing from the spirit of the present invention.

What is claimed is:
1. A multi-layer laminating machine comprising a drive cylinder, means for rotating said drive cylinder, a plurality of lamina supply rolls spaced about said cylinder in peripheral contact therewith, individual support means for each of said supply rolls, each of said support means including, a rotatable shaft, a pair of spaced brackets affixed at one end to said shaft, means to adjust the positioning of said brackets longitudinally along said shaft, and a pair of opposed spindles rotationally mounted at the other end of said brackets to support the central axis of a supply roll spaced therebetween, means to adjust the circumferential position of said supply rolls about said cylinder, means biasing said rolls in continual peripheral contact with said cylinder, each supply roll depositing a layer of material for said multilayer lamination upon said drive cylinder upon rotation thereof, and take-off means for removing the multilayer lamination from said cylinder.

2. A machine according to claim 1 wherein the take-off means includes spool means driven by the means for rotating said cylinder and includes an intermediate take-off idler roller.

3. A machine according to claim 1 wherein one or more of said support means includes intermediate transfer cutting cylinders between the periphery of the supply roll and said drive cylinder.

References Cited in the file of this patent
UNITED STATES PATENTS

| | | |
|---|---|---|
| 1,216,790 | Faunce | Feb. 20, 1917 |
| 1,563,382 | Legg | Dec. 1, 1925 |
| 1,712,124 | Stack | May 7, 1929 |
| 1,911,338 | Anderson et al. | May 30, 1933 |
| 2,686,013 | Christian | Aug. 10, 1954 |
| 2,983,459 | Gray et al. | May 9, 1961 |